United States Patent [19]

Holt

[11] Patent Number: 5,060,861

[45] Date of Patent: Oct. 29, 1991

[54] COAXIAL PAINT HOSE AND SUPPLY SYSTEM

[75] Inventor: Earl R. Holt, Rochester, Mich.

[73] Assignee: Hose Specialties, Capri, Inc., Detroit, Mich.

[21] Appl. No.: 237,838

[22] Filed: Aug. 29, 1988

[51] Int. Cl.⁵ ............................................. F16L 39/02
[52] U.S. Cl. ..................................... 239/124; 285/155
[58] Field of Search .............. 239/124, 127, 113, 112, 239/119, 125, 126; 137/565, 597; 285/133.1, 155

[56] References Cited

U.S. PATENT DOCUMENTS

| 993,507 | 5/1911 | Collins | 285/133.1 |
|---|---|---|---|
| 1,743,245 | 1/1930 | Smith . | |
| 2,031,849 | 2/1936 | O'Leary | 285/155 |
| 2,619,163 | 11/1952 | Wynne et al. . | |
| 2,645,524 | 7/1953 | Kelly | 239/112 |
| 2,663,325 | 12/1953 | Bede | 239/127 |
| 3,131,869 | 5/1964 | Vega et al. . | |
| 3,212,555 | 10/1965 | Schuss et al. . | |
| 3,529,626 | 9/1970 | German | 239/124 |
| 3,734,407 | 5/1973 | De Stefano, Jr. . | |
| 4,106,699 | 8/1978 | Holt | 239/124 |
| 4,159,554 | 7/1979 | Knight et al. . | |
| 4,209,042 | 6/1980 | Buan | 138/126 |
| 4,217,062 | 8/1980 | Trp et al. | 401/44 |
| 4,367,769 | 1/1983 | Bain | 285/155 |
| 4,732,414 | 3/1988 | Inaba | 285/133.1 |
| 4,754,782 | 7/1988 | Grantham | 285/133.1 |

FOREIGN PATENT DOCUMENTS 0883190 10/1971 Canada .............................. 285/133.1

Primary Examiner—Andres Kashnikow
Assistant Examiner—C. G. Trainor
Attorney, Agent, or Firm—Harness, Dickey & Pierce

[57] ABSTRACT

A flexible coaxial conduit in a recirculating paint supply system disposed between a flow control restrictor connected to a paint spray nozzle and a pressurized paint supply line and return line for supplying paint to the nozzle in a quantity in excess of that required to provide continued recirculation and uniformity in the composition and quality of the liquid coating composition. The coaxial conduit is substantially transparent and in a preferred embodiment, the outer tube is of a composite construction to provide optimum flexibility while retaining resistivity to the attack from the liquid paint composition.

7 Claims, 2 Drawing Sheets

FIG I

COAXIAL PAINT HOSE AND SUPPLY SYSTEM

BACKGROUND OF THE INVENTION

The present invention broadly relates to recirculating-type liquid coating or paint supply systems of the types in widespread commercial use for keeping heavily-bodied pigments suspended in the liquid coating composition thereby promoting uniformity in the quality and color of the paint film applied to a substrate. Recirculating paint supply systems conventionally comprise a mixing tank equipped with suitable agitation for maintaining the liquid coating composition uniformly mixed and a pump for transferring the liquid coating composition under a desired pressure to an automatic or manual spray nozzle. A suitable return line of a reduced pressure is provided for returning the excess quantity of paint back to the mixing tank for recirculation. A flow control or restrictor device is conventionally employed at the inlet of the spray nozzle or spray gun which is adjustable so as to control the actual quantity of liquid coating composition for discharge through the spray nozzle.

In large commercial installation, such as in spray booths of the type employed for painting automobile bodies and the like, each spray booth or station is generally equipped with a plurality of individual paint supply systems of different color and/or type. Typically, twelve or more individual colored paint supply systems are installed at each spray station to achieve the required flexibility. It will be appreciated that each such system includes a pressure supply line and a return line such that in a station equipped with twelve separate systems, a total of twenty-four conduits or tubes are required which makes the spray station somewhat cumbersome from an operating standpoint. The supply tubes are normally about 15 to 20 feet in length and are of flexible structure extending between the main supply header and main return header to the spray nozzle.

PRIOR ART

U.S. Pat. No. 2,619,163 to Wynne et al discloses a coaxial supply and return system for supplying fuel to a burner system. U.S. Pat. No. 2,645,524 has a coaxial supply system for delivering heated asphalt and solvent to a spray nozzle. U.S. Pat. No. 2,663,325 shows a paint supply system with a flexible split tube having a divider along its length to provide more than one flow passage in the tube. U.S. Pat. No. 3,529,626 to German has a coaxial paint supply system for a recirculating paint system wherein the inner passage is the supply line and the outer passage is the return line.

The present invention overcomes many of the problems and disadvantages associated with prior art dual supply and return systems by providing a coaxial paint supply system achieving improved flexibility and at the same time substantially reducing the number and physical size of the supply and return system thereby providing for increased efficiency and ease of application of coating systems to substrates while improving the housekeeping environment of a multiple coating composition spray station.

SUMMARY OF THE INVENTION

The benefits and advantages of the present invention are obtained in a recirculating paint supply system that has a flexible coaxial conduit connected between the flow control device on a spray nozzle and the supply and return conduits of a recirculating paint supply system. The coaxial conduit comprises an outer flexible tube adapted to be connected at one end thereof to a coupling disposed in communication with the pressurized liquid paint supply conduit and at the other end thereof to a flow restrictor disposed in communication with a spray nozzle. An inner tube having a first end connected to the main return conduit extends axially within the outer tube and terminates at a second end thereof disposed at a position axially spaced from the flow control restrictor and disposed with the second end in communication with the interior of the outer tube for receiving and returning the excess liquid paint supplied to the nozzle. The coupling includes a branch conduit for introducing the inner tube in liquid sealed relationship from a position exterior of the outer tube to a position in axial extending relationship within the outer tube.

In accordance with a preferred embodiment of the present invention particularly applicable for the manual spray application of liquid coating compositions, the outer tube is of a composite construction comprising an outer layer of a strong flexible and transparent material and an inner layer of a material which is resistant to attack of the liquid coating composition passing therethrough.

Additional benefits and advantages of the present invention will become apparent upon a reading of the description of the preferred embodiments taken in conjuction with the accompanying drawings.

DESCRIPTION OF THE PREFERRED EMBODIMENTS

Figure 1:
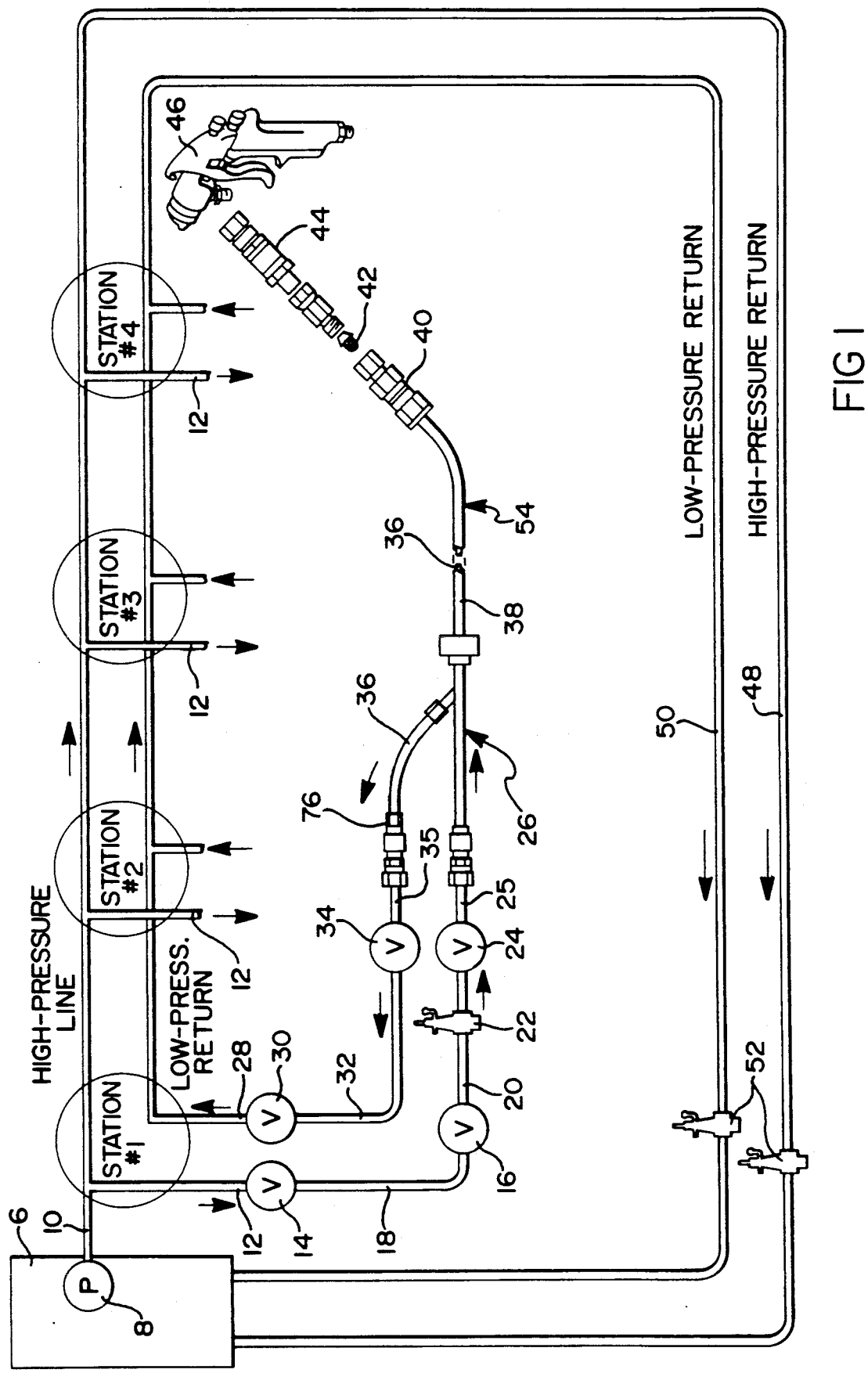
FIG. 1 is a schematic, partly exploded view of a multiple spray station arrangement of a recirculating liquid paint coating composition supply system embodying the invention.

Referring now in detail to the drawings, and as may be best seen in FIG. 1, a multiple station recirculating paint supply system is illustrated comprising four separate stations each provided with a pressurized liquid coating or paint supply line and a return line. It will be appreciated, that the system as illustrated in FIG. 1 is duplicated numerous times to provide for a plurality of different coating compositions and/or different colors such that each spray station may include, for example, twelve different systems to supply twelve different colors of the desired coating composition. The system illustrated in FIG. 1 illustrates a single recirculating paint supply of a specific color for spray station No. 1 and typically includes a supply tank 6 in the mixing room which is equipped with suitable agitation (not shown) and a supply pump 8 for supplying the liquid coating composition under high pressure to a main supply header 10. A branch line 12 at each spray station is connected to the supply header and in turn is connected to a main shutoff valve 14 at the spray station entry which in turn is connected to a second valve 16 by means of a conduit 18 which in turn is connected to a third conduit 20 to a fluid pressure regulator 22 and then to a third valve 24 adapted to be connected by conduit 25 to a Y-shaped coupling 26 of the present invention. As noted in FIG. 1, each spray station has a return header 28 provided with a valve 30 which is connected by means of a conduit 32 to a second shutoff valve 34. The second shutoff valve 34 is connected by conduit and coupling 35 to one end of an inner tube 36 of the Y-shaped coupling 26 which extends axially and inwardly in a manner more fully illustrated in FIG. 3 within an outer tube 38 defining the coaxial supply system of the present invention.

As illustrated in FIG. 1, the outer tube 38 is connected by a suitable coupling in fluid tight relationship to a flow control or fluid restrictor 40 of a type as illustrated in U.S. Pat. No. 4,106,699 of the present inventor, granted Aug. 15, 1978, the teachings of which are incorporated herein by reference. In the specific arrangement illustrated in FIG. 1, the system further preferably includes a filter element 42 disposed in line with the fluid restrictor which in turn is connected to a quick disconnect coupling 44 adapted to be attached to a conventional air atomized spray nozzle or gun 46.

The quantity of paint supplied through the main supply header 10 is in excess of that required at the multiple spray stations and the balance thereof is returned to the supply tank 6 in the mix room through a high pressure return line 48. The liquid coating composition returned to the recirculating system at each of the spray stations enters a low pressure return line 50 which also is in communication with the supply tank 6 in the mix room. Both the high pressure return line 48 and low pressure return line 50 are suitably equipped with back-pressure regulators 52.

In accordance with the foregoing arrangement, a continuous supply of substantially uniformly mixed liquid coating composition or paint is supplied to each spray station in a quantity of excess of that required and a portion of the excess paint is continuously returned at each spray station to the low pressure return line 50 which in combination with that from the high pressure return line 48 is recirculated to the supply tank for remixing and reblending and for recirculation back through the system.

Figure 2:
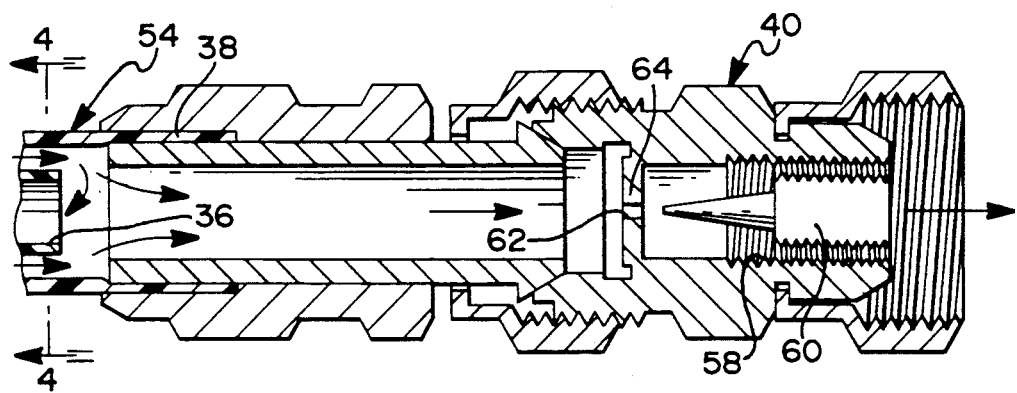
FIG. 2 is a fragmentary enlarged sectional view of one end of the coaxial conduit connected to the flow control restrictor attached to the paint spray nozzle.
Figure 3:
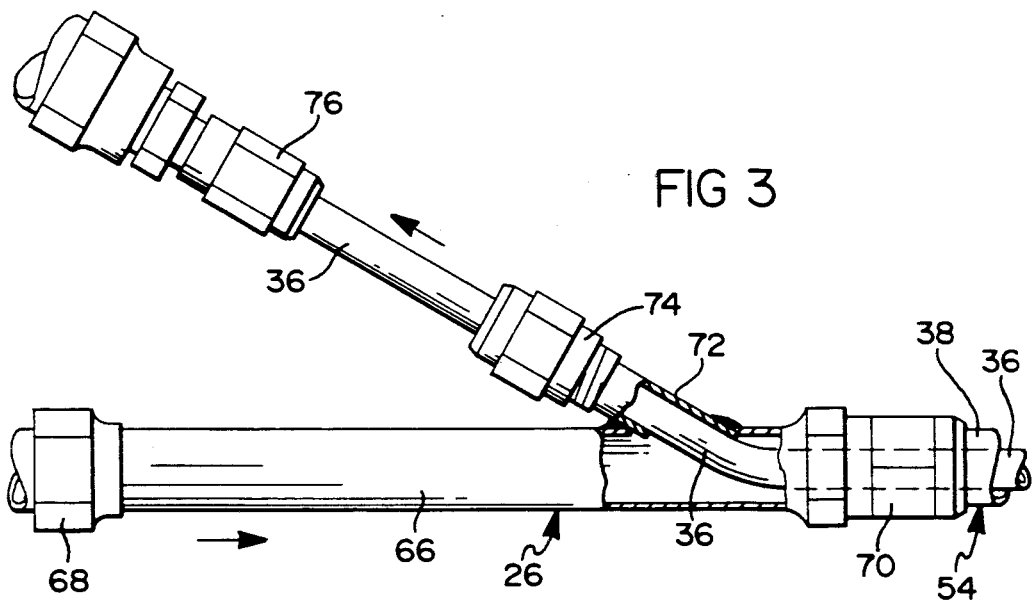
FIG. 3 is a fragmentary enlarged elevational view partly in section of the coupling for introducing the inner tube in axially extending relationship within the outer tube.

As shown in FIG. 1, the coupling 26 is connected by means of a coaxial conduit 54 to the fluid restrictor 40 in a manner that is more clearly shown in FIGS. 2 and 3 of the drawings. The fluid restrictor is of an axial type including a threaded inner bore 58 in which a flow control meter valve 60 is threadably secured having a tapered end portion which is disposed in axial flow restricting relationship and in axial alignment relative to an aperture 62 in an orifice plate 64 disposed in the inlet side of the fluid restrictor. Axial adjustment of the meter valve 60 controls the quantity of liquid coating composition to be supplied to the spray nozzle. The meter valve 60 is generally of a square or rectangular cross section so as to permit fluid flow axially along the flat sides of the meter valve in all of its adjusted positions.

The opposite end of the coaxial supply conduit 54 is connected as shown in FIG. 3 to the coupling 26 comprising a tubular member 66 formed with a coupling 68 at the inlet end thereof for connecting the coupling to the conduit 25 and third valve 24 (FIG. 1) and a tube connector 70 at the other end thereof for connecting the outer tube 38 in fluid tight relationship to the tubular member 66. The coupling 26 is further provided with an angular branch tube 72 through which the inner tube 36 extends and is sealed by means of a threaded seal 74 to the outlet end thereof. The inner tube 36 is connected to a suitable fluid tight threaded coupling 76 at its outer end for connecting the inner tube 36 in liquid tight relationship to the conduit 35 and second shutoff valve 34 (FIG. 1).

The Y-shaped coupling 26 in accordance with the arrangement illustrated in FIG. 3 provides for a fluid and pressure tight connection by which the inner tube 36 extends from a position exterior of the outer tube 38 to a position in axial extending relationship inside of and coaxial with the outer tube 38.

Figure 4:
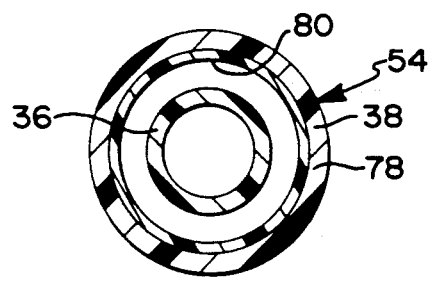
FIG. 4 is a transverse vertical sectional view through the coaxial conduit illustrating the composite construction of the outer tube as taken along the line 4—4 of FIG. 2.

In accordance with a preferred embodiment of the present invention, and as shown in FIG. 4, the outer tube 38 is of a composite construction comprising an outer flexible layer 78 of high strength and high flexibility and an inner continuous layer 80 comprised of a material which is resistant to attack by the liquid coating compositions in contact therewith. The provision of such a composite construction of the outer tube 38 enables a higher attainment of flexibility of the coaxial conduit in comparison with the use of a unitary construction. Particularly satisfactory results are attained when the outer flexible layer 78 is comprised of a mixture of nylon and polyurethane plastics achieving high strength, transparency and good flexibility. The inner layer may comprise nylon which has been found particularly resistant to attach from coating compositions of the general types known in the art. Similarly, the inner tube 36 may be comprised of nylon in that both the exterior and interior surfaces thereof are disposed in contact with the liquid coating composition. The improved flexibility of the coaxial supply conduit is particularly desirable when the spray nozzle is manually manipulated by an operator.

While it will be apparent that the invention herein described is well calculated to achieve the benefits and advantages set forth above, it will be appreciated that the invention is susceptible to modification, variation and change without departing from the spirit and scope thereof.

What is claimed is:

1. In a recirculating paint supply system or the like including a pressured high pressure supply conduit for supplying a liquid coating composition to a spray nozzle in an amount in excess of that required and a return conduit for returning the excess coating composition to a supply tank, the improvement comprising a substantially Y-shaped coupling having a substantially straight large diameter section and an integral small diameter branch section extending at an angle to the large diameter section and opening into it, a flexible coaxial conduit connected between the spray nozzle and the supply and return conduits, said coaxial conduit comprising an outer flexible tube connected at one end thereof to the large diameter section of said Y-shaped coupling and at the other end thereof to a flow restrictor disposed in communication with a spray nozzle, said coaxial conduit including an inner tube having a first end thereof extending into the Y-shaped coupling and out of it through said branch section where it may be connected to the return conduit, said inner tube extending axially within said outer tube and terminating at the second end thereof at a position axially spaced from the flow restrictor and disposed with said second end in communication with the interior of said outer tube for receiving and returning the excess paint supply, said branch section providing means for introducing said inner tube in liquid sealed relationship from a position exterior of said outer tube to a position in axial extending relationship within said outer tube.

2. A system as set forth in claim 1 in which said outer tube is of a composite construction comprising an inner layer of a coating composition resistant material and an outer layer of a flexible supporting material.

3. A system as set forth in claim 2 in which said inner layer is comprised of nylon.

4. A system as set forth in claim 2 in which said outer layer is comprised of a misture of nylon and polyurethane to provide a high strength, transparent and chemically resistant tube.

5. A system as set forth in claim 1 in which said outer tube is substantially transparent.

6. A system as set forth in claim 1 in which said inner tube is comprised of nylon.

7. In a recirculating paint supply system or the like that has a high pressure supply conduit for supplying a liquid coating composition to a spray nozzle in an amount in excess of that required and a return conduit for returning the excess coating composition to a supply tank, the improvement comprising a coupling of Y-shaped configuration and including a large diameter section and an integral small diameter section opening into the large diameter section, flexible coaxial conduit connected between the spray nozzle and the supply and return conduits, said coaxial conduit comprising an outer flexible tube connected at one end thereof to the large diameter section of said coupling and at the other end being in communication with a spray nozzle, said coaxial conduit including an inner tube having a first end thereof extending into the coupling and out of it through said small diameter section and extending axially within said outer tube and terminating at the second end thereof in communication with the interior of said outer tube for receiving and returning the excess paint supply, the small diameter section of said coupling introducing said inner tube in liquid sealed relationship from a position exterior of said outer tube to a position in axial extending relationship within said outer tube.

* * * * *

UNITED STATES PATENT AND TRADEMARK OFFICE
CERTIFICATE OF CORRECTION

PATENT NO. : 5,060,861
DATED : October 29, 1991
INVENTOR(S) : Earl R. Holt It is certified that error appears in the above-identified patent and that said Letters Patent is hereby corrected as shown below:

Column 3, line 43, "of" (first occurrence) should be --in--.

Column 5, line 18, Claim 4, "misture" should be --mixture--.

Signed and Sealed this

Twenty-third Day of November, 1993

Attest:

BRUCE LEHMAN

*Attesting Officer*    Commissioner of Patents and Trademarks